Jan. 28, 1969     W. B. TYRRELL, JR     3,423,760
METHOD OF DRESS SHIELD MANUFACTURE
Filed May 10, 1966     Sheet _1_ of 3
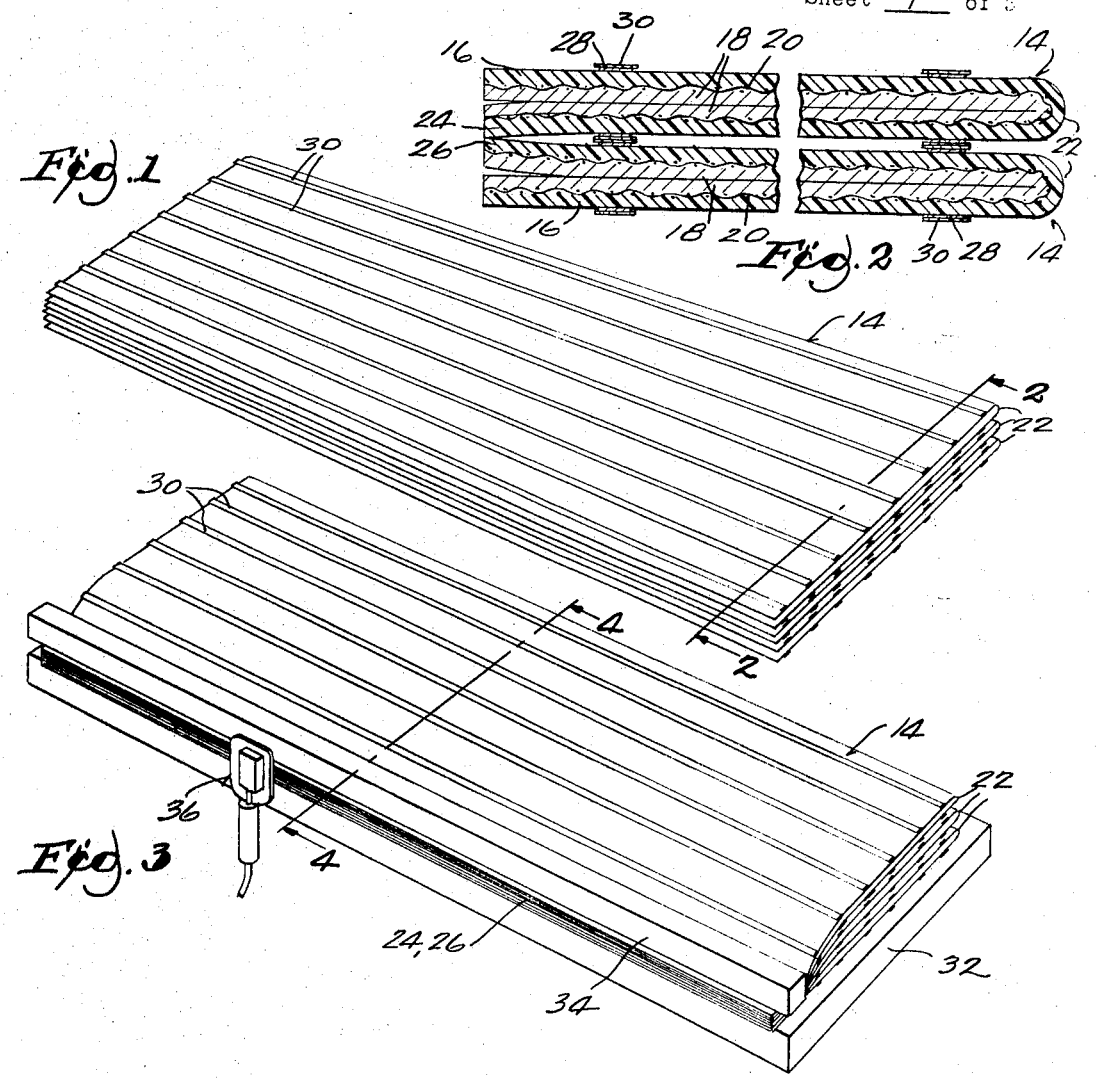
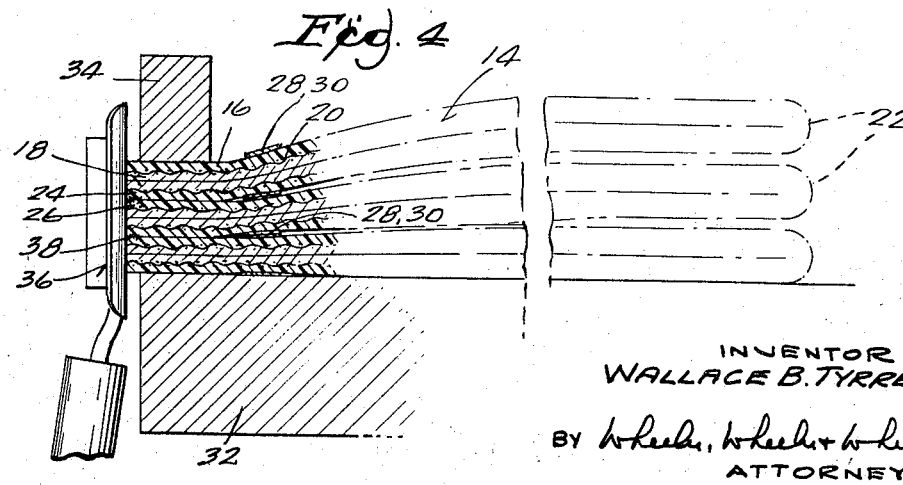
INVENTOR
WALLACE B. TYRRELL, JR
BY Wheeler, Wheeler + Wheeler
ATTORNEYS

INVENTOR
WALLACE B. TYRRELL, JR

BY Wheeler, Wheeler & Wheeler
ATTORNEYS

INVENTOR
WALLACE B. TYRRELL, Jr
BY Wheeler, Wheeler & Wheeler
ATTORNEYS

United States Patent Office 3,423,760
Patented Jan. 28, 1969

3,423,760
METHOD OF DRESS SHIELD MANUFACTURE
Wallace B. Tyrrell, Jr., Venice, Fla., assignor to Tyrrell Industries, Inc., Venice, Fla., a corporation of Florida
Filed May 10, 1966, Ser. No. 548,927
U.S. Cl. 2—58          8 Claims
Int. Cl. A41d 27/12; B65h 39/00

ABSTRACT OF THE DISCLOSURE

Composite webs of paper, gauze, and heat-sealable plastic, prefabricated to include spaced longitudinally extending transfer tapes and protective strips, are first folded longitudinally and then stacked with their free edges aligned at one side of the stack and their folds aligned at the other. A heat sealing instrument is then passed along the free edges to unite heat sealable plies of adjacent webs. Disposable dress shields with wide intermediate wings and narrow terminal tabs are blanked transversely from the stacked webs. Each shield has transfer tapes and protective strips extending across it to its extreme margins.

---

This invention relates to a disposable dress shield and method of dress shield manufacture. The shield and method herein disclosed are improvements on the shield and method disclosed in my Patent No. 3,145,391 and in my Patent 3,259,911.

The shield is made from a web of paper and a moisture resistant and heat sealable ply such as polyethylene laminated together upon a very light, wide-mesh gauze. The shield is gathered and folded upon itself with the paper side of the stock on the inside and the poly side out. Adhered to the poly side of each shield are four transfer tapes extending across the fold, two of them being spaced at opposite sides of the wider portion of the shield and two extending across the fold on the end tabs which are centered on the fold and which project from the shield proper.

As explained in my said Patent 3,259,911, each transfer tape comprises a strip coated on both faces with pressure sensitive adhesive, one face being adhered to the polyethylene ply of the shield and the other face being protected temporarily by a release strip. It will be noted that the orientation of the transfer tapes is different from that disclosed in Patents Nos. 3,145,391 and 3,259,911. Manufacture of the shields according to the present invention requires additional tape but more than compensates for this by very substantial savings in labor.

In the improved method of manufacture, a web of the laminated paper and polyethylene having the transfer tapes with their protective strips already applied thereto at proper intervals is cut into lengths which are then longitudinally folded with the polyethylene ply and adherent transfer tapes on the outside. By way of example and not by way of limitation, I am using lengths which are eight feet long cut from a web forty-four inches wide and folded to a twenty-two inch width.

The pre-folded lengths are then superimposed in a stack of any desired number of lengths, all of the folds being at one side of the stack and the edges superimposed by the folding operation being at the other side of the stack. With such edges clamped securely in the stack they are trimmed, as by an electrically heated die or knife, and a heat sealing die is then moved along the trimmed edges sufficiently slowly so that the polyethylene faces which are in contact have portions proximate their edges heat sealed to each other. The heat penetrates into the stack sufficiently so that the plastic surfaces are fused for a distance which may approximate one-thirty-second of an inch.

A die applied transversely to the stack of interconnected folded lengths severs a row of shield blanks which, by reason of the heat seals, are not only connected to each other across each level of each length of stock but are connected from level to level by the folds of the respective lengths and the heat sealed connection of each length with the length beneath it and the length above it. After a given operation of the blanking die, relative movement between the die and the stack of folded lengths of stock puts the die in position for the blanking of another row of interconnected shields, the spacing being such as to leave, in each instance, an intermediate or remnant row of shields which is formed without a separate die cutting operation. One of the advantages of this procedure lies in the fact that by simply increasing the spacing between successive blanking operations, I am able to produce the so-called remnant row of shields of any desired increased width. The wider shields are used in men's clothing and elsewhere.

After a forth and back row of shield blanks has been die cut as above described, it is opened out into a chain having alternating wide portions and narrow connecting tabs, and stitched longitudinally of the chain with a gathering stitch. This stitch reduces the width of each shield along its ultimate fold line and thereby forms an arcuate fold across which the gathers extend. There is a very slight amount of waste between the tabs of successive shields. After the gathering-stitch operation, this waste is removed, thereby severing the shields, which are then folded along the line of gathering stitch to complete the products.

An advantage of having the tape oriented to extend across the fold line as above described lies in the fact that one or both sides of the shield may be trimmed if desired. This is desirable, for example, when the shield is to be used with a garment having a short or cap sleeve.

In the drawings:

FIG. 1 is a view in perspective showing a loose stack of lengths of multiple ply material prepared by attachment of the transfer tapes as above described, the several lengths being longitudinally folded with their fold lines superimposed at one side of the stack and their free lateral edges superimposed at the other side of the stack.

FIG. 2 is a view taken in section on the line 2—2 of FIG. 1 and greatly enlarged.

FIG. 3 shows the application of a clamping bar to fasten together the free lateral margins of the several lengths of multi-ply stock and also showing a heat sealer in use to adhere to each other adjacent portions of the plies of thermo-plastic material which are in mutual face contact in the stack.

FIG. 4 is a greatly enlarged detail view taken on the line 4—4 of FIG. 3.

Figures 5, 6:
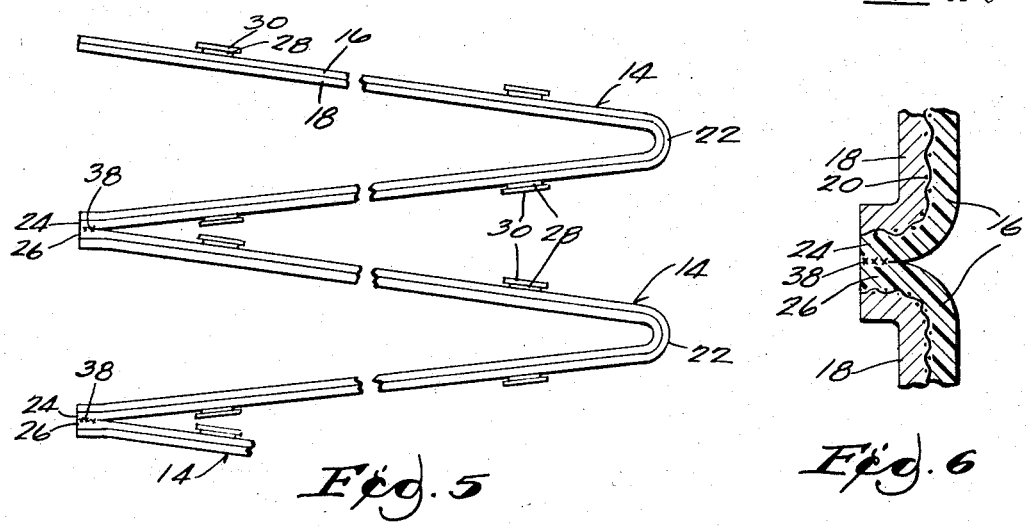
FIG. 5 is a greatly enlarged fragmentary view in end elevation showing the lengths of material partially opened out following their connection to each other by the heat sealing operation.
FIG. 6 is a greatly enlarged detail view in section showing the heat sealed connection.

Starting with a laminated web which already has transfer tapes applied longitudinally thereof, lengths are cut, folded and stacked (FIG. 1). As best shown in the enlarged detail section of FIG. 2, each folded length 14 of stock comprises on its outer face a ply 16 of any appropriate heat sealable film such as polyethylene. Its inner face 18 is paper. Between these two plies is laminated the gauze 20. By means of the fold 22, the free margins 24 and 26 of the polyethylene ply 16 are brought into face contact. The transfer tapes 28, each with its protective strip 30, extend longitudinally of the length of web and are on the outside of the folded length 14.

With the folded lengths 14 superimposed in a stack on table 32 as shown, they are clamped by pressure bar 34 and the projecting free edges 24, 26 are trimmed and then subjected to a heat sealing operation by moving the heat sealing tool 36 slowly along the edges. The heat of the tool softens and fuses the heat sealable material at those edges 24 and 26, the fusing to a limited depth of penetration being shown at 38 in FIG. 6. In consequence, all of the stacked folded lengths of multi-ply stock are connected together in zig-zag manner by folds along one margin of the stack and by the fused polyethylene ply margins at the other side of the stack. Thus, if the material which is uppermost in the stack is lifted, the assembly will open up as shown in FIG. 5.

Figure 7:
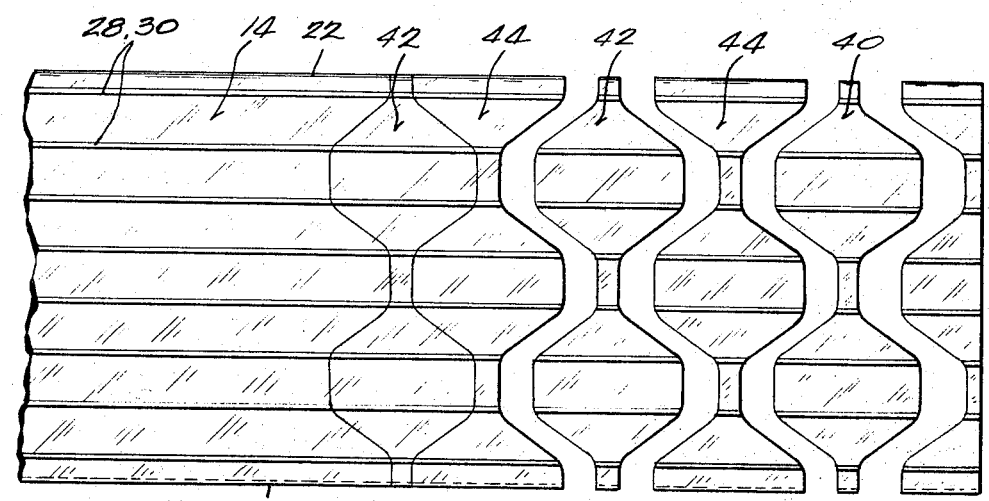
FIG. 7 is a view of the zig-zag folded stack of stock lengths following two spaced applications thereto of a blanking die.
Figure 8:
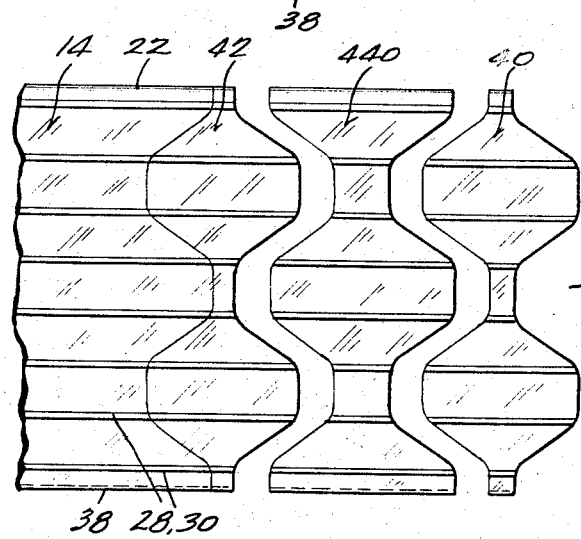
FIG. 8 is a view similar to FIG. 7 showing how the width of the remnant chain of blanks may be increased by greater spacing between the points of application of the blanking die.

However, the material is not thus unfolded at this stage. Instead, it is subjected to a die cutting operation, the die being used at spaced points along the stack of folded webs as now interconnected. The form of the die is indicated precisely by the form of the interconnected blanks which are severed in the use of the die, one such chain of interconnected blanks being shown at 40 in FIG. 7 and another at 42. This leaves another chain of interconnected blanks at 44 intermediate the set 40 and the set 42. The chain 44 is called a remnant chain because it does not require a separate die cutting operation. The width of the blanks of the remnant chain may be varied simply by varying the relative movement between the die and the work between the operations which sever chain 40 and chain 42 from the stack of folded and pre-interconnected lengths 14. This is shown in FIG. 8 in which the spacing between chain 40 and chain 42 has been widened to leave a remnant 440 which is wider than the remnant chain 44 of FIG. 7.

Figure 9:
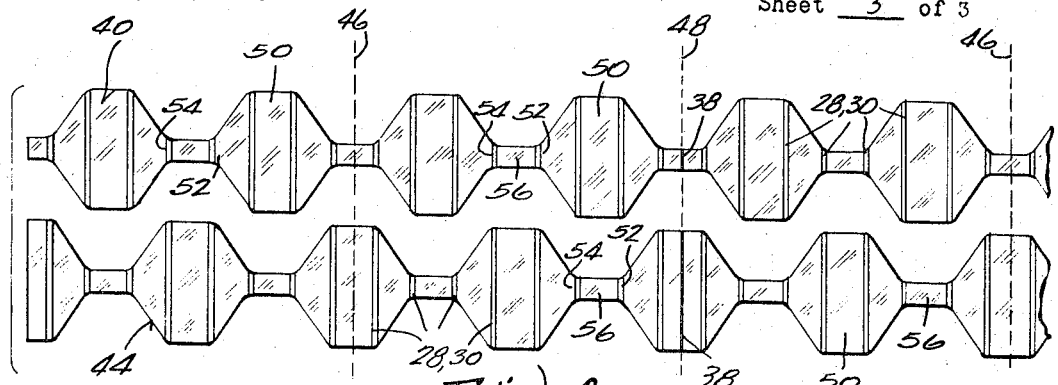
FIG. 9 shows in opened out positions two of the resulting chain of blanks resulting from the operation shown in FIG. 7.

FIG. 9 shows in associated positions the blanks of chain 40 and the blanks of chain 44 as they appear when opened out. The positions of respective fold lines are indicated at 46 and the positions of respective heat sealed connections are indicated at 48. Each blank comprises a shield portion 50 and tab portions 52 and 54. The tab portions 52 and 54 have interconnecting waste at 56. The length of the tab portions 52, 54 and waste 56 of one chain equals the length of the shield portion of the adjacent chain, the margins being complementary.

Each fold line 22 of the original length passes through the waste stock 56 of one series and through the shield portion 50 of the next adjacent series. The same is true of the heat seal 38 which passes through the waste 56 of one series and the shield portion 50 of the next consecutive series. It is further to be noted that the spacing between the transverse tapes 28 is such that each of the shield portions 50 of the resulting product carries two transfer tapes spaced in proximity to its opposite sides, and each of the tab portions of each blank also carries a length of transfer tape extending transversely of its fold.

Figure 10:
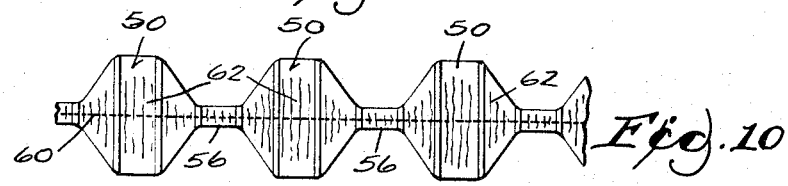
FIG. 10 is a fragmentary detail view in plan showing the gathering-stitch operation on a row of connected blanks.
Figure 11:
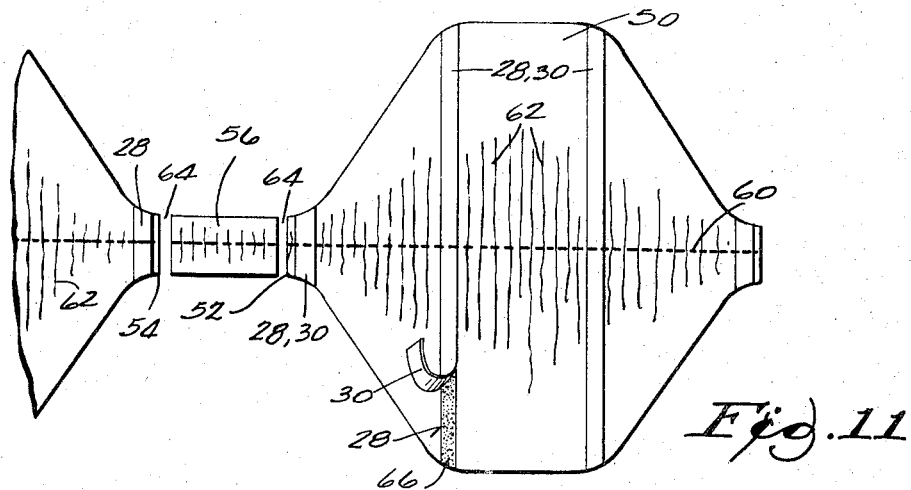
FIG. 11 is an enlarged fragmentary detail view showing the removal of waste from between tabs of successive shields, and consequent severance of the shields.

While the blanks are still interconnected in a chain by the waste portions 56, they are gather-stitched throughout the length of the chain, the gather-stitching being shown at 60 and the resulting gathers at 62 in FIG. 10 and FIG. 11.

The severance of the waste 56 by cutting the series at spaced points 64 (FIG. 11) leaves the short tabs 54 and 52 projecting from the ends of shield portion 50 and centered with respect to the line of gather-stitching shown at 60. FIG. 11 clearly shows this relationship and also shows the protecting strip 30 partially pulled from the transfer tape 28, the exposed adhesive on the surface of the transfer tape being indicated by stippling at 66.

The blank is now folded along the line of the gather-stitch 60. The relative reduction of the width of stock along the line of stitching forms a concave top edge 68 for the completed product shown in FIG. 12. The paper ply 18 is outermost and the polyethylene ply 16 is innermost. The transfer tapes 28 are on the inside, being adhered to the polyethylene ply and hence are shown only in dotted lines in FIG. 12.

Figure 12:
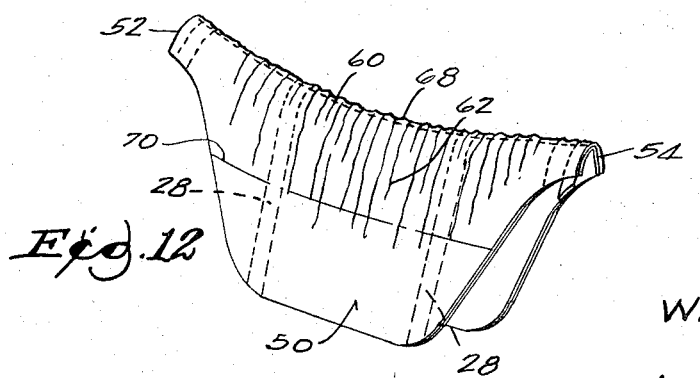
FIG. 12 shows the final product formed by folding the completed blank along the line of gather-stitching.

Due to the fact that the tapes extend across the fold, it is feasible to trim either side of the shield portion 50 as, for example, along the dotted line indicated at 70 in FIG. 12. No matter how much the shield portion is trimmed, it still retains a very substantial amount of transfer tape adhesive for releasable attachment to a garment, upon removal of the protective strip 30. There is also a substantial amount of adhesive provided by tapes extending across the fold to be exposed on both sides of each of the projecting tabs 52 and 54. The pressure-sensitive adhesive permits ready removal for disposition and replacement of a used shield.

I claim:

1. A method of manufacture of a disposable dress shield, said method comprising prefabrication of a series of lengths of multi-ply stock, folding each such length longitudinally, stacking the folded lengths with their respective folds at one side of the stack and free margins of the respective lengths at the other side of the stack, connecting the free margins of adjacent lengths at said other side of the stack, and cutting rows of dress shield blanks from the resulting zig-zag folded stock.

2. A method according to claim 1 including the further steps of laminating a ply of heat sealable material on one face of the stock, the folding step disposing the heat sealable material outwardly, and the stacking step placing the heat sealable plies of successive folded lengths into face contact with each other, and the connecting step comprising the heat sealing along one side of the stack of marginal portions of the said plies in face contact.

3. A method according to claim 1 in which the cutting of rows of connected blanks is done in a die cutting operation in which two sides of one row of blanks are cut concurrently and the next die cutting operation is spaced along the stack from the die cutting operation aforesaid whereby to leave a remnant row of connected blanks between the rows of blanks severed by the spaced die cutting operations.

4. A method according to claim 3 in which the spacing between the respective die cutting operations is greater than the width of the rows of blanks severed by said operations whereby the remnant row of blanks has greater width than the first mentioned rows of blanks.

5. A method accirding to claim 3 including the step of adhering transfer tapes longitudinally of the lengths of stock preliminary to the die cutting of rows of blanks therefrom and at spacings on the lengths of stock such that a plurality of transfer tapes will be disposed in substantially like portions across each blank.

6. A method of manufacturing a disposable dress shield, said method comprising laminating paper and heat sealable plastic plies in a web, attaching transfer tapes to the heat sealable plies longitudinally of the web, severing lengths of laminated stock from the web, folding each such length longitudinally with the heat sealable ply outermost to comprise a length having a fold at one side and free margins at its other side, stacking superimposed folded lengths, the respective heat sealable plies of superimposed lengths being in face contact and having respective folded and free margins correspondingly oriented, subjecting the free margins of the stacked lengths to clamping pressure, applying heat sealing temperatures to the clamped free margins of heat sealable plies which are in face contact, whereby to fuse said plies for limited distances inwardly from said free margins, die cutting rows of shield blanks interconnected with each other in a direction transversely between the folded and sealed margins to form a chain of connected blanks, unfolding the blanks of said chain, gather-stitching the blanks connected in said chain centrally of the respective blanks for the length of the chain, severing the blanks in a direction transverse to the gather-stitching and parallel to the transfer tapes, and folding the respective severed blanks along the line of gather-stitching to comprise a dress shield having transfer tapes extending across the fold line to the margins of the dress shield remote therefrom.

7. A method according to claim 6 in which the steps of the method are performed in any appropriate order and the die cutting to form connected rows of dress shield blanks is so conducted as to make blanks having relatively wide shield portions and relatively narrow tabs intervening between said shield portions and waste stock connecting said tabs and spacing the shield portions at a distance such as to accommodate an adjacent wide shield portion of a blank in an adjacent series of blanks.

8. A method according to claim 7 in which successive die cutting steps are performed following relative movement between the stack of folded lengths and the points at which the die cutting steps are performed at a distance which is greater than the width of the shield portions cut from said stack by the blank, whereby to leave between said points a remnant chain of interconnected blanks of greater width than the die cut chain of blanks.

References Cited

UNITED STATES PATENTS

| | | | |
|---|---|---|---|
| 2,344,781 | 3/1944 | Mullen | 2—53 |
| 2,562,508 | 7/1951 | Rand | 2—53 |
| 3,141,174 | 7/1964 | Meier-Nieper | 2—53 |
| 3,145,391 | 8/1964 | Tyrrell | 2—56 |

JORDAN FRANKLIN, *Primary Examiner.*

ALFRED R. GUEST, *Assistant Examiner.*

U.S. Cl. X.R.

156—269